(12) United States Patent
Li

(10) Patent No.: US 8,582,285 B2
(45) Date of Patent: Nov. 12, 2013

(54) MOUNTING APPARATUS FOR EXPANSION CARD

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 293 days.

(21) Appl. No.: 13/216,412

(22) Filed: Aug. 24, 2011

(65) Prior Publication Data

US 2012/0153101 A1    Jun. 21, 2012

(30) Foreign Application Priority Data

Dec. 17, 2010   (CN) .......................... 2010 1 0593715

(51) Int. Cl.
| | |
|---|---|
| *G06F 1/16* | (2006.01) |
| *H05K 7/00* | (2006.01) |
| *H05K 5/00* | (2006.01) |
| *H05K 7/14* | (2006.01) |

(52) U.S. Cl.
USPC ................. 361/679.32; 361/679.31; 361/747; 361/759; 361/801

(58) Field of Classification Search
USPC ........................ 361/679.31, 679.32, 801, 802, 361/807–810, 747, 759, 752, 790; 439/160
See application file for complete search history.

(56) References Cited

U.S. PATENT DOCUMENTS

| 6,950,313 | B1 * | 9/2005 | Shih ............................... 361/759 |
| 7,012,813 | B2 * | 3/2006 | Wang et al. .................... 361/801 |
| 7,120,032 | B2 * | 10/2006 | Lin et al. ........................ 361/801 |
| 7,561,440 | B2 * | 7/2009 | Dai ................................ 361/801 |

* cited by examiner

*Primary Examiner* — Jayprakash N Gandhi
*Assistant Examiner* — Nidhi Desai
(74) *Attorney, Agent, or Firm* — Altis & Wispro Law Group, Inc.

(57) ABSTRACT

A mounting apparatus for an expansion card includes a chassis, a mounting frame, a hull, and a mounting member. The mounting frame is secured to the chassis and is adapted to secure a first end of an expansion card. The hull is secured to the chassis, and is adapted to maintain a second end of the expansion card opposite to the first end. The mounting member is rotatably attached to the hull, and comprises two limiting boards. The mounting member is rotatable between a lock position and an open position. In the lock position, the mounting member abuts the top surface of the expansion card. In the open position, the mounting member disengages from the expansion card.

19 Claims, 7 Drawing Sheets

MOUNTING APPARATUS FOR EXPANSION CARD

BACKGROUND

1. Technical Field

The present disclosure relates to mounting apparatuses, and more particularly to a mounting apparatus for securing expansion cards in an electronic device.

2. Description of Related Art

A computer system usually includes expansion cards, such as sound cards, video cards, graphics cards and so on, for enhancing the capabilities of the computer system. The expansion cards are often fixed in the computer system with screws. However, using screws to fix the expansion cards is very laborious and time-consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
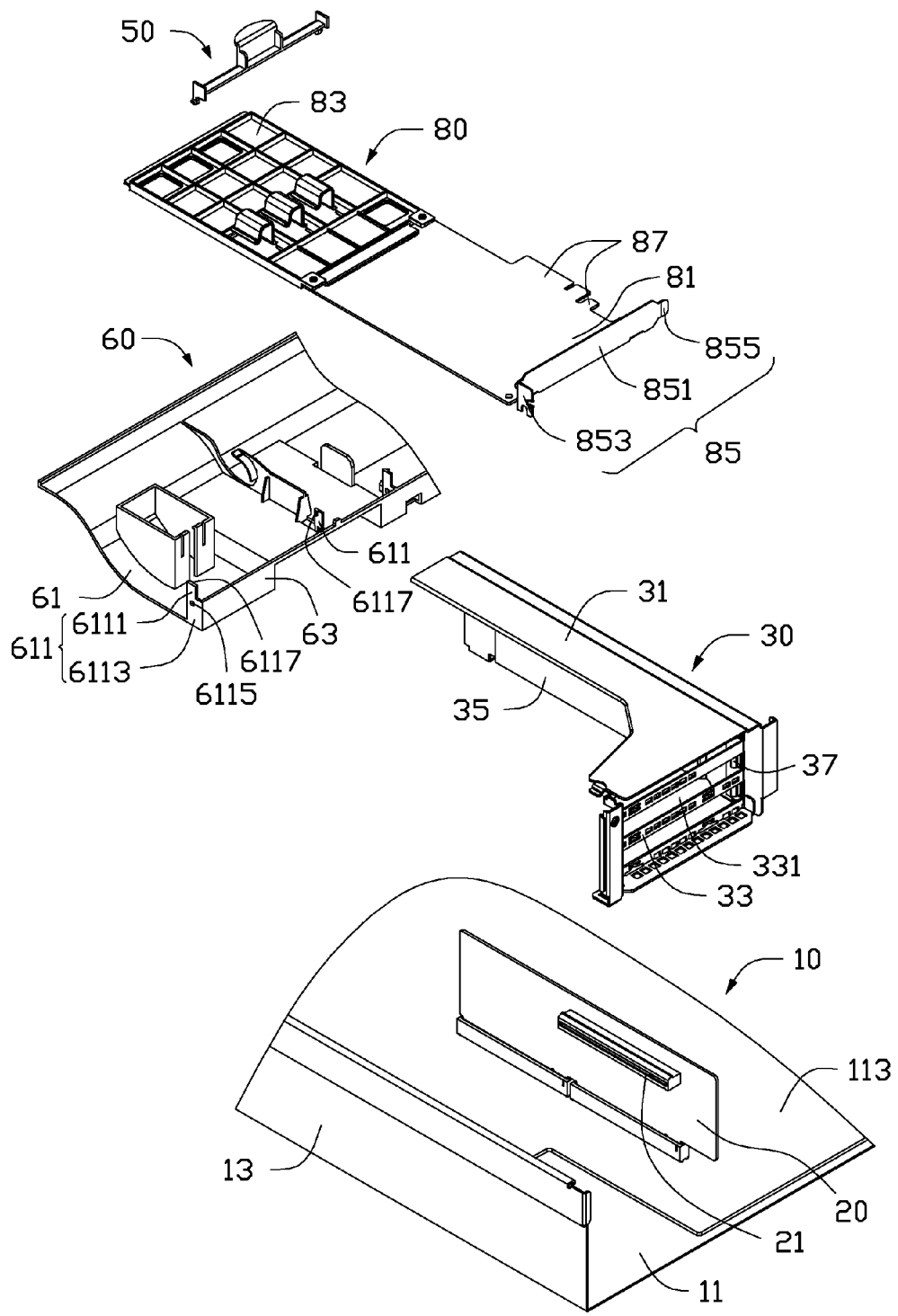
FIG. 1 is an exploded, isometric view of an embodiment of a mounting apparatus for an expansion card and an expansion card.

Referring to FIG. 1, an embodiment of a mounting apparatus for mounting an expansion card 80 includes a chassis 10, a mounting frame 30, a mounting member 50, and a hull 60.

Figure 3:
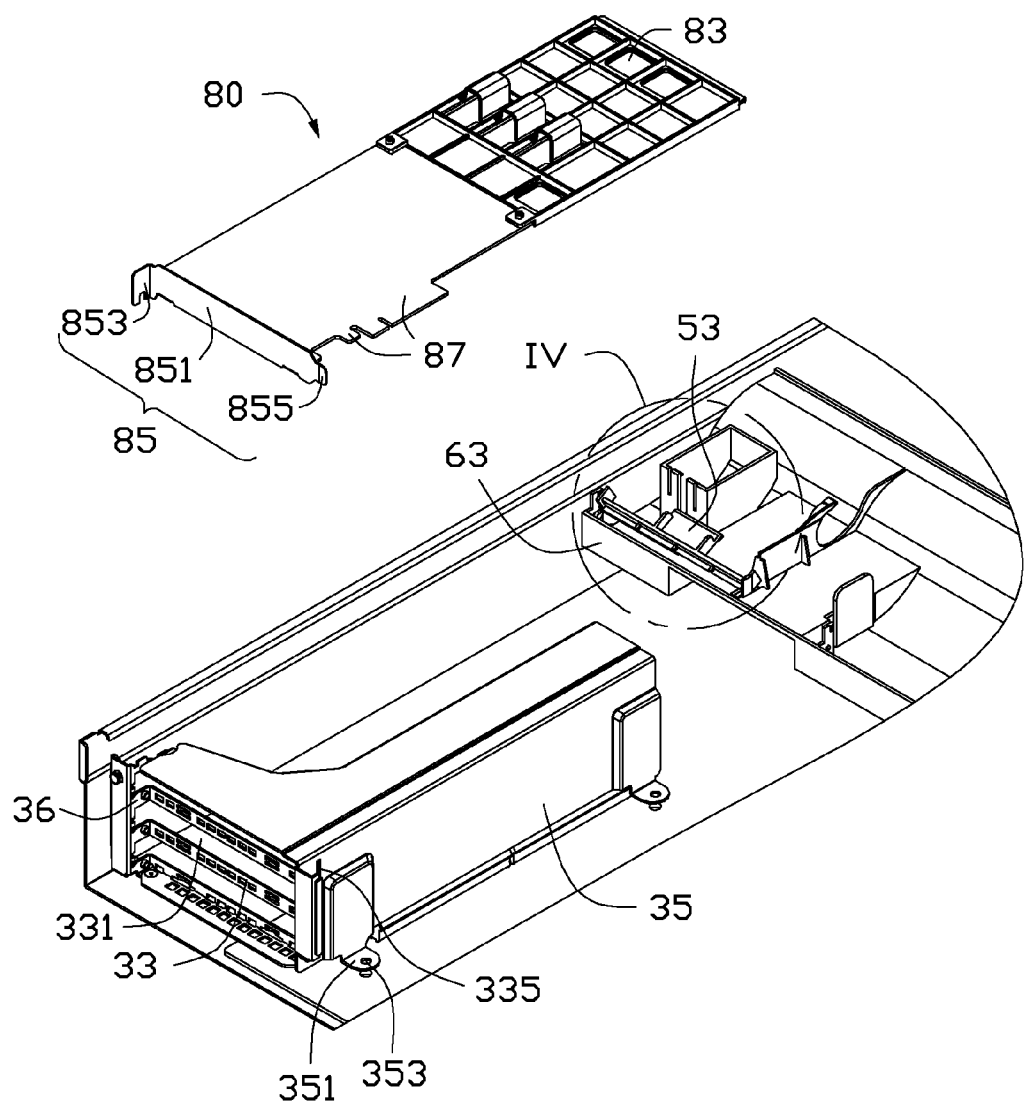
FIG. 3 is an isometric view of the assembled mounting apparatus for an expansion card and the expansion card of FIG. 1.

The expansion card 80 includes a first end 81 and a second end 83 opposite to the first end 81 (as shown in FIG. 3). A mounting piece 85 is secured in the first end 81. The mounting piece 85 includes a body 851, a mounting portion 853 and an inserting portion 855. The mounting portion 853 is located on an end of the body 851, and the inserting portion 855 extends from another end of the body 851. An inserting portion 87 is located on the bottom end of the body 851.

The chassis 10 includes a bottom plate 11 and a side plate 13. In one embodiment, the side plate 13 is substantially perpendicular to the bottom plate 11. A main board 113 is secured to the bottom plate 11. A riser card 20 is secured to the main board 113 and is substantially parallel to the side plate 13. An inserting end 21 is located on the riser card 20.

The mounting frame 30 includes a top wall 31, a rear wall 33 and a sidewall 35. The rear wall 33 defines a plurality of slots 331. A mounting plate 36 extends from a side edge of the rear wall 33 (shown as FIG. 3). A bridge portion (not shown) is located in the sidewall 35, for receiving the inserting portion 855. A blocking piece 37 extends from each edge of each slot 331. A gap is defined between the blocking piece 37 and the rear wall 33. A plurality of mounting pieces 351 extends from the rear wall 33 and the sidewall 35. Each mounting piece 351 defines a mounting hole 353. A locking member, such as a screw, is inserted into the mounting hole 353 to secure the mounting frame 30 to the main board 113.

Figure 2:
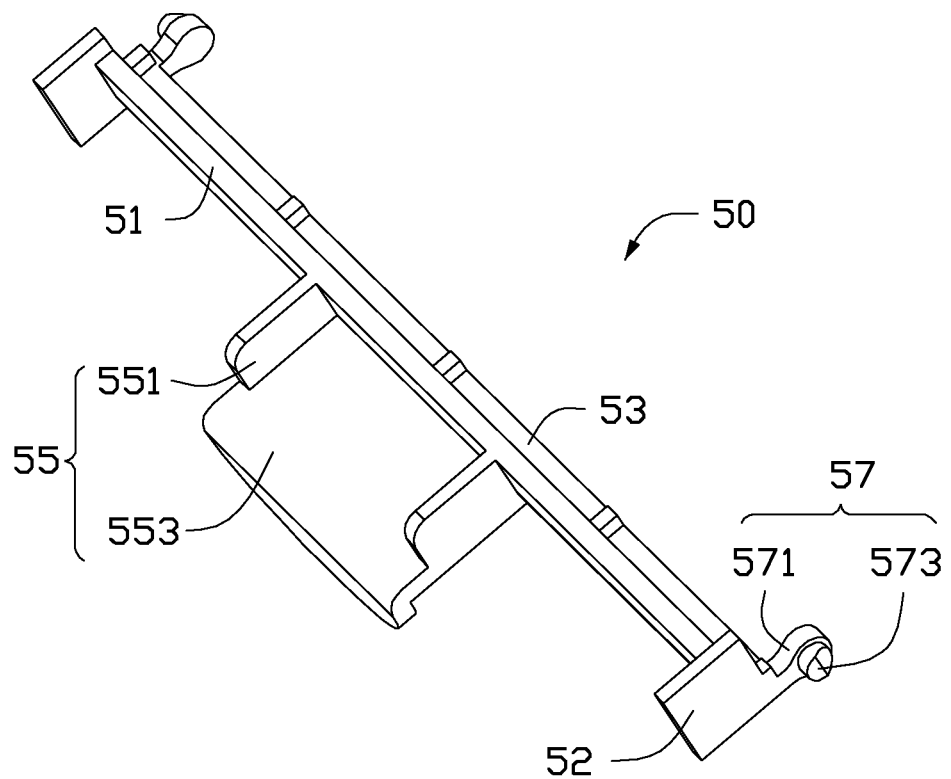
FIG. 2 is an isometric view of a mounting member of the mounting apparatus of FIG. 1.

Referring to FIG. 2, the mounting member 50 includes a horizontal rod 51, two blocking portions 52, a maintaining plate 53, an operating portion 55, and two latching portions 57. In one embodiment, the horizontal rod 51 is substantially perpendicular to the maintaining plate 53, and the blocking portions 52 are substantially perpendicular and connected to the horizontal rod 51 and the maintaining plate 53. The blocking portion 52 includes a first blocking plane 521 (shown in FIG. 4) and a second blocking plane 523 (shown in FIG. 7). The first blocking plane 521 and the second blocking plane 523 are substantially perpendicular to the horizontal rod 51. The operating portion 55 is located on the horizontal rod 51 and includes a maintaining piece 551 and an operating board 553.

The maintaining piece 551 is substantially perpendicular to the horizontal rod 51, and the operating board 553 extends from the top edge of the maintaining piece 551. The operating board 553 is substantially perpendicular to the maintaining piece 551. Each latching portion 57 includes a positioning piece 571 and a rotating portion 573. The positioning piece 571 extends from two side edges of the horizontal rod 51, and is substantially parallel to the two blocking portions 52.

Figure 4:
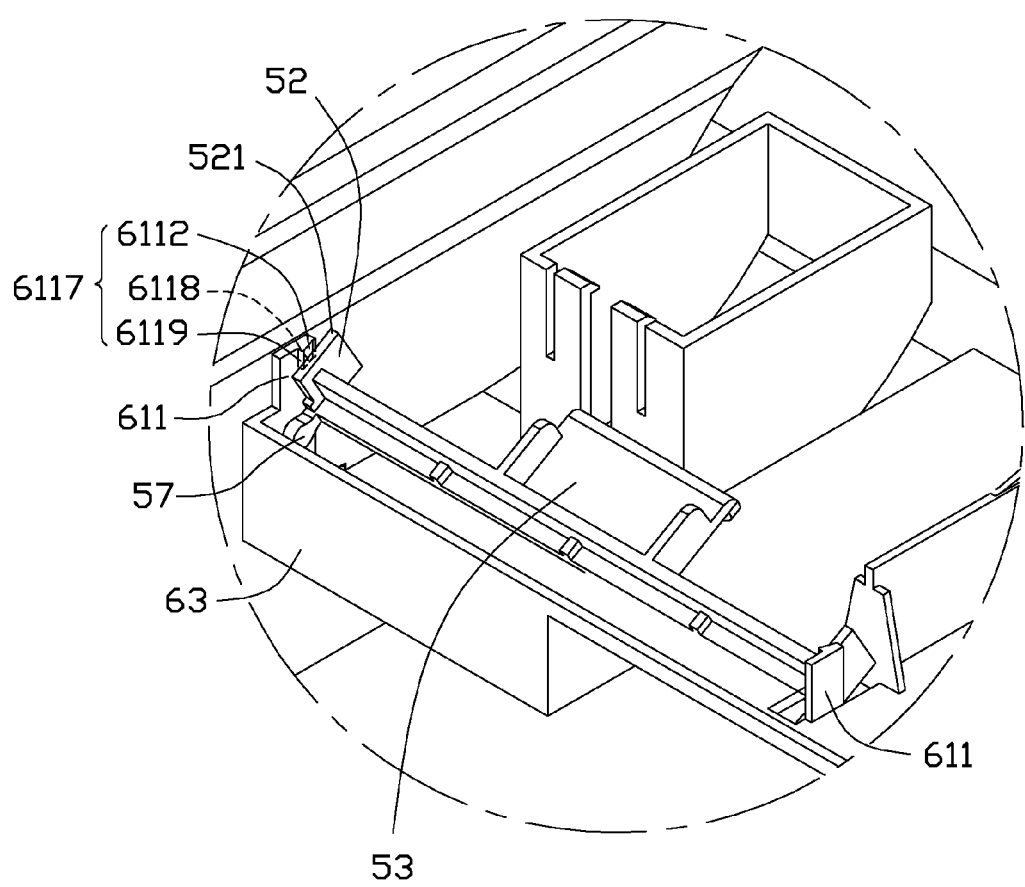
FIG. 4 is an enlarged view of an encircled portion IV of FIG. 3.

Referring to FIGS. 1, 3, and 4, the hull 60 includes a top panel 61 and a side panel 63. The top panel 61 is substantially perpendicular to the side panel 63. A plurality of elastically deformable limiting boards 611 is located in a corner between the top panel 61 and the side panel 63. The limiting boards 611 are substantially perpendicular and connected to the top panel 61 and the side panel 63. Each limiting board 611 includes a securing portion 6111 and a limiting portion 6113. The securing portion 6111 defines a securing hole 6115. The securing hole 6115 is located between the first limiting plane 6118 and the top panel 61. A limiting block 6117 extends from each limiting portion 6113. The limiting block 6117 includes a rotatable plane 6112, a first limiting plane 6118 and a second limiting plane 6119. The rotatable plane 6112 extends obliquely from a side edge of the limiting portion 6113. The first limiting plane 6118 is substantially perpendicular to the side panel 63, and the second limiting plane 6119 is substantially parallel to the side panel 63. The angle defined between the rotatable plane 6112 and the limiting portion 6113 is acute. In one embodiment, the hull 60 is an air duct. The hull 60 is secured to the chassis 10 and guides air to flow along a direction towards the rear wall 33. In one embodiment, the blocking block 6117 extends from one limiting board 611.

In assembly, one limiting board 611 is pulled outwardly thereby elastically deforming the one limiting board 611 to expand the distance between the two limiting boards 611. The mounting member 50 is positioned between the two limiting boards 611, and the rotating portions 573 are aligned with the rotatable holes 6115. The one limiting board 611 elastically returns to engage the rotating portions 573 to the rotatable holes 6115. The mounting member 50 is now rotatably attached to the hull 60.

Figure 5:
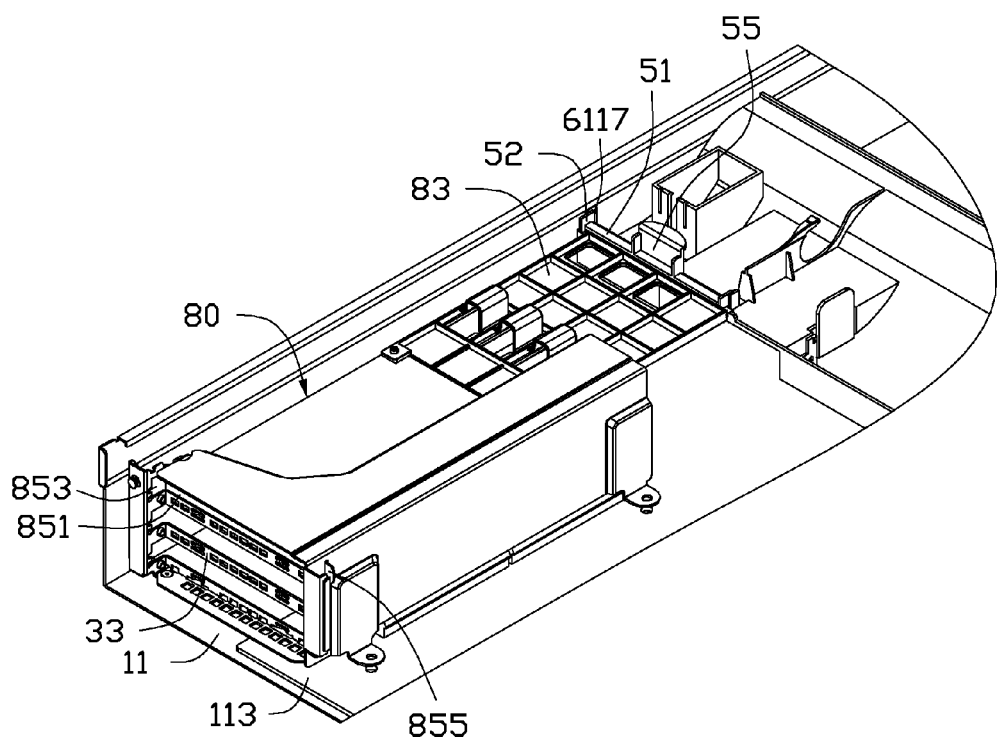
FIG. 5 is an isometric view of FIG. 3.
Figure 6:
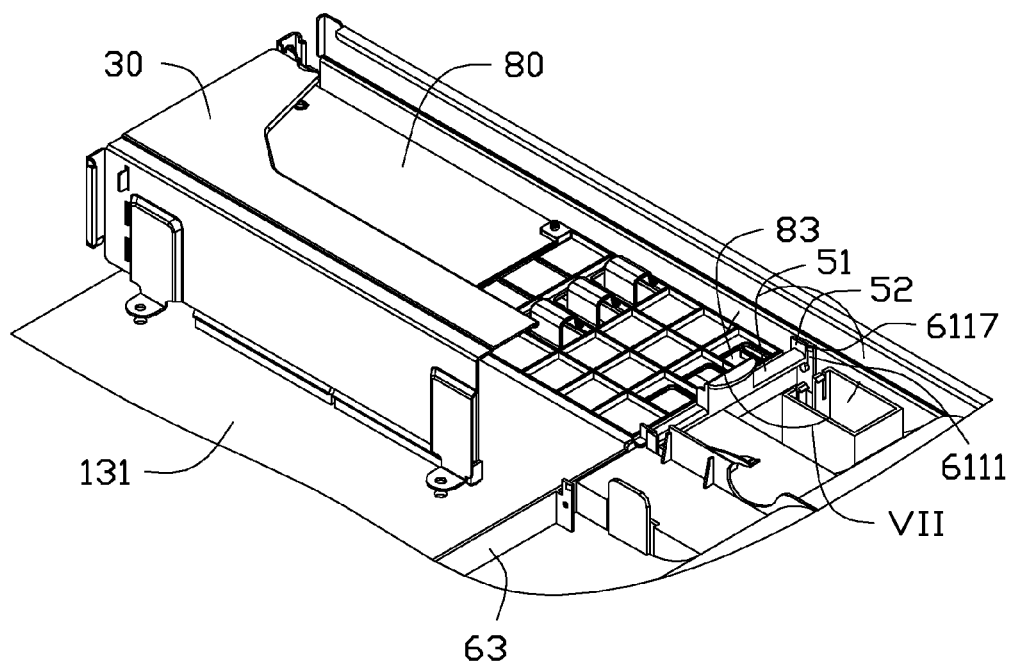
FIG. 6 is similar to FIG. 4, but viewed from another aspect.
Figure 7:
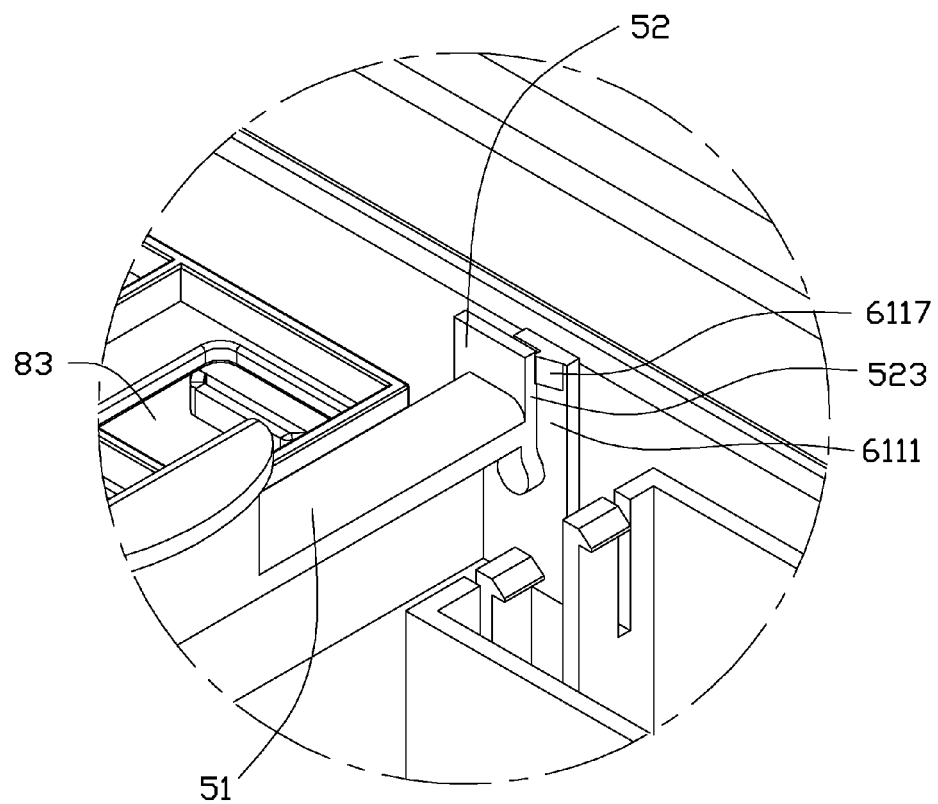
FIG. 7 is an enlarged view of the encircled portion VII of FIG. 6.

Referring to FIGS. 5-7, the mounting member 50 is rotatable between an open position and a locked position. When the mounting member 50 is in the open position, the first blocking plane 521 abuts the first limiting plane 6118, and the blocking portion 52 is located between the first limiting plane 6118 and the top panel 61. The limiting block 6117 prevents the rotation of the mounting member 50 along a first direction towards the expansion card 80. When the mounting member 50 is in the locked position, the second blocking plane 523 abuts the second limiting plane 6119, and the blocking portion 52 is located between the second limiting plane 6119 and the side panel 63. The limiting block 6117 prevents the rotation of the mounting member 50 along a second direction opposite to the first direction. The open position is the initial position when the mounting member 50 is assembled to the hull 60.

In assembly of the expansion card 80, the inserting portion 855 is inserted into the bridge portion of the sidewall 35. The inserting portion 87 is inserted into the inserting end 21. The mounting portion 853 abuts the mounting plate 36 and is secured to the mounting plate 36 with a screw. The second end 83 is placed on the side panel 63. The mounting member 50 is rotated along the first direction, the two limiting boards 611 are pressed by the mounting member 50, then the two limiting boards 611 are elastically deformed to expand the distance between them. The blocking portion 52 is slid along the rotating plane 6112. Until the blocking portion 52 is rotated over the rotating plane 6112, the two limiting boards 611 respond, and the second blocking plane 523 abuts the second limiting plane 6119. The mounting member 50 is located in the locked position. The horizontal rod 51 abuts the top surface of the expansion card 80, and sandwiches the second end 83 of the expansion card between the horizontal rod 51 and the hull 60.

In disassembly of the expansion card 80, the two limiting boards 611 are pulled outwardly to expand the distance between them. At the same time, the mounting member 50 is rotated along the second direction. The blocking portion 52 is then disengaged from the second limiting plane 6119 and abuts the rotating plane 6112. Until the blocking portion 52 is rotated over the rotating plane 6112, the first blocking plane 521 abuts the first limiting plane 6118. The mounting member 50 is located in the open position and the expansion card 80 is disengaged from the mounting member 50. The expansion card 80 can then be removed from the chassis 10.

It is to be understood, however, that even though numerous characteristics and advantages have been set forth in the foregoing description of the embodiments, together with details of the structures and functions of the embodiments, the disclosure is illustrative only and changes may be made in detail, especially in matters of shape, size, and the arrangement of parts within the principles of the disclosure, to the full extent indicated by the broad general meaning of the terms in which the appended claims are expressed.

What is claimed is:

1. A mounting apparatus for an expansion card, the mounting apparatus comprising: a chassis; a mounting frame secured to the chassis and adapted to secure a first end of the expansion card; a hull secured to the chassis and adapted to maintain a second end of the expansion card opposite to the first end; and a mounting member rotatably attached to the hull; wherein the hull comprises two limiting boards and a limiting block extending from at least one of the two limiting boards; the mounting member is rotatable between a lock position and an open position; in the lock position, the mounting member abuts a top surface of the expansion card, and the limiting block prevents the rotation of the mounting member along a first direction towards the expansion card; in the open position, the mounting member disengages from the expansion card, and the limiting block prevents the rotation of the mounting member along a second direction opposite to the first direction; wherein the hull comprises a side panel and a top panel, the side panel is adapted to maintain the expansion card, and the side panel is substantially perpendicular to the top panel; the limiting block comprises a first limiting plane and a second limiting plane, the first limiting plane is substantially perpendicular to the side panel, and the second limiting plane is substantially parallel to the side panel; the mounting member is located between the first limiting plane and the top panel in the open position, and the mounting member is located between the second limiting plane and the side panel in the lock position.

2. The mounting apparatus of claim 1, wherein the mounting member further comprises a horizontal rod and two latching portions extending from two opposite side edges of the horizontal rod, the horizontal rod is adapted to abut the top surface of the expansion card when the mounting member is located in the lock position, and the two latching portions are located between the two limiting boards and abut the two limiting boards.

3. The mounting apparatus of claim 2, wherein the mounting member further comprises two blocking portions extending from two opposite side edges of the horizontal road, wherein each blocking portion comprises a first blocking plane and a second blocking plane, and the first blocking plane and the second blocking plane are substantially perpendicular to the horizontal rod; the first blocking plane abuts the first limiting plane when the mounting member is located in the open position, and the second blocking plane abuts the second limiting plane when the mounting member is located in the lock position.

4. The mounting apparatus of claim 2, wherein each latching portion comprises a positioning piece extending from the horizontal rod and a rotatable portion extending from the positioning piece, and the positioning piece is substantially perpendicular to the horizontal rod; each limiting board defines a securing hole, the positioning piece is located between the two limiting boards, and the rotatable portion is engaged in the securing hole.

5. The mounting apparatus of claim 2, wherein the mounting member further comprises an operating portion extending from the horizontal rod, to drive the mounting member to rotate.

6. The mounting apparatus of claim 1, wherein the limiting block further comprises a rotating plane extending obliquely from the limiting board, and the mounting member is rotated from the open position to the lock position along the rotating plane.

7. The mounting apparatus of claim 6, wherein a first angle defined between the rotating plane and the limiting board is acute.

8. The mounting apparatus of claim 6, wherein a second angle defined between the rotating plane and the first limiting plane is acute, and a third angle defined between the rotating plane and the second limiting plane is acute.

9. The mounting apparatus of claim 1, wherein the hull is an air duct guiding air to flow towards the mounting frame.

10. A mounting apparatus for an expansion card, the mounting apparatus comprising: a chassis; a mounting frame secured to the chassis and adapted to secure a first end of an expansion card; a hull secured to the chassis and comprising a top panel and a side panel adapted to maintain a second end of the expansion card opposite to the first end, the side panel being substantially perpendicular to the top panel; and a mounting member rotatably attached to the hull; wherein the hull further comprises two limiting boards and a limiting block extending from at least one of the two limiting boards; the limiting block comprises a first limiting plane and a second limiting plane, the first limiting plane is substantially perpendicular to the side panel, and the second limiting plane is substantially parallel to the side panel; the mounting member is rotatable between a lock position and an open position; in the lock position, the mounting member abuts a top surface of the expansion card, and the mounting member is located between the second limiting plane and the side panel; in the open position, the mounting member disengages from the expansion card, and the mounting member is located between the first limiting plane and the top panel.

11. The mounting apparatus of claim 10, wherein the mounting member further comprises a horizontal rod, the two latching portions extending from two opposite side edges of the horizontal rod and is substantially perpendicular to the horizontal rod, and the horizontal rod is adapted to abut the top surface of the expansion card when the mounting member is located in the lock position.

12. The mounting apparatus of claim 11, wherein the mounting member further comprises two blocking portions extending from two opposite side edges of the horizontal road, wherein each blocking portion comprises a first blocking plane and a second blocking plane, and the first blocking plane and the second blocking plane are substantially perpendicular to the horizontal rod; the first blocking plane abuts the first limiting plane when the mounting member is located in the open position, and the second blocking plane abuts the second limiting plane when the mounting member is located in the lock position.

13. The mounting apparatus of claim 12, wherein the first blocking plane is located between the second blocking plane and the side panel when the mounting member is located in the lock position.

14. The mounting apparatus of claim 11, wherein each latching portion comprises a positioning piece extending from the horizontal rod and a rotatable portion extending from the positioning piece, and the positioning piece is substantially perpendicular to the horizontal rod; each limiting board defines a securing hole, the positioning piece is located between the two limiting boards, and the rotatable portion is engaged in the securing hole.

15. The mounting apparatus of claim 14, wherein the securing hole is located between the first limiting plane and the top panel.

16. The mounting apparatus of claim 10, wherein the limiting block further comprises a rotating plane extending obliquely from the limiting board, and the mounting member is rotated from the open position to the lock position along the rotating plane.

17. The mounting apparatus of claim 16, wherein a first angle defined between the rotating plane and the limiting board is acute.

18. The mounting apparatus of claim 16, wherein a second angle defined between the rotating plane and the first limiting plane is acute, and a third angle defined between the rotating plane and the second limiting plane is acute.

19. The mounting apparatus of claim 10, wherein the hull is an air duct guiding air flow to flow towards the mounting frame.

* * * * *